US007829163B2

(12) United States Patent
Albenice et al.

(10) Patent No.: US 7,829,163 B2
(45) Date of Patent: Nov. 9, 2010

(54) SHRINK SLEEVE FOR AN ARTICLE CLOSURE

(75) Inventors: Philip J. Albenice, Sellersburg, IN (US); John Voelker, Walton, KY (US)

(73) Assignee: Multi-Color Corporation, Cincinnati, OH (US)

( * ) Notice: Subject to any disclaimer, the term of this patent is extended or adjusted under 35 U.S.C. 154(b) by 851 days.

(21) Appl. No.: 11/253,044

(22) Filed: Oct. 18, 2005

(65) Prior Publication Data

US 2007/0084545 A1 Apr. 19, 2007

(51) Int. Cl.

| | |
|---|---|
| ***B65B 53/00*** | (2006.01) |
| ***B65B 7/00*** | (2006.01) |
| ***F16B 4/00*** | (2006.01) |
| ***B29C 65/00*** | (2006.01) |
| ***B32B 37/00*** | (2006.01) |
| ***B32B 38/14*** | (2006.01) |
| ***B29D 22/00*** | (2006.01) |
| ***B65D 39/00*** | (2006.01) |
| ***B65D 41/00*** | (2006.01) |
| ***B65D 43/00*** | (2006.01) |
| ***B65D 47/00*** | (2006.01) |
| ***B65D 51/00*** | (2006.01) |

(52) U.S. Cl. .......................... 428/34.9; 156/69; 156/86; 156/213; 156/277; 215/230; 215/246

(58) Field of Classification Search .................. 156/69, 156/84, 85, 86, 213, 215; 215/230, 232, 215/246, 273; 428/34.9
See application file for complete search history.

(56) References Cited

U.S. PATENT DOCUMENTS 2,223,017 A 11/1940 Abrams et al.
3,023,554 A 3/1962 Hlavacek et al.
3,400,810 A 9/1968 Makowski
3,515,270 A * 6/1970 Tonn et al. .................. 426/127
3,927,484 A * 12/1975 Spiegel et al. ................. 40/307
4,000,824 A * 1/1977 Han ........................... 215/232
4,515,849 A * 5/1985 Keino et al. ................. 428/201

(Continued)

FOREIGN PATENT DOCUMENTS

AU 514945 3/1981

(Continued)

OTHER PUBLICATIONS

International Search Report, PCT/US2006/040514, 2 pgs.

*Primary Examiner*—Jeff H Aftergut
*Assistant Examiner*—Brian R Slawski
(74) *Attorney, Agent, or Firm*—Wood, Herron & Evans, L.L.P.

(57) ABSTRACT

The present invention provides a shrink sleeve for use on a closure of an article. The present invention does so by providing a decorated closure for an article, such as a container, used to package an item or items. The decorated closure includes a shrink sleeve and a closure for an article. The closure has a top end, a bottom end, and a side surface. The closure may further include a centerpoint of the top end and a centerpoint of the bottom end with a longitudinal axis passing therethrough. The shrink sleeve is shrunk around at least the side surface of the article, and includes at least one visible decoration on a surface of the shrink sleeve.

18 Claims, 2 Drawing Sheets

U.S. PATENT DOCUMENTS

| | | | | |
|---|---|---|---|---|
| 4,830,895 | A | 5/1989 | Bernard | |
| 5,067,612 | A | 11/1991 | Tsuchiya et al. | |
| 5,168,989 | A | 12/1992 | Benno | |
| 5,170,905 | A | 12/1992 | Luch | |
| 5,217,307 | A | 6/1993 | McClintock | |
| 5,246,762 | A * | 9/1993 | Nakamura | 428/172 |
| 5,452,802 | A | 9/1995 | Green | |
| 5,544,770 | A * | 8/1996 | Travisano | 215/230 |
| 5,605,230 | A | 2/1997 | Marino, Jr. et al. | |
| 5,607,999 | A | 3/1997 | Shimizu et al. | |
| 5,641,084 | A * | 6/1997 | Rice | 215/246 |
| 5,813,540 | A | 9/1998 | Vollbrecht et al. | |
| 6,022,912 | A | 2/2000 | Spitler et al. | |
| 6,342,456 | B1 * | 1/2002 | Jenkins et al. | 442/208 |
| 6,352,785 | B1 | 3/2002 | Hanada et al. | |
| 6,691,439 | B1 * | 2/2004 | Miyashita et al. | 40/310 |
| 2005/0035081 | A1 | 2/2005 | Fitch | |

FOREIGN PATENT DOCUMENTS

| | | |
|---|---|---|
| EP | 0408016 | 1/1991 |
| GB | 2 051 723 A | 1/1981 |
| WO | 2005048218 | 5/2005 |

* cited by examiner

SHRINK SLEEVE FOR AN ARTICLE CLOSURE

FIELD OF THE INVENTION

The present invention relates to shrink films for various articles, and in particular, to shrink sleeves for containers having closures.

BACKGROUND OF THE INVENTION

Shrink films, such as shrink sleeves and shrink wraps, are used in labeling, often as an alternative to pressure-sensitive labels, heat-transfer labels, in-mold labels, and other labels. Shrink labeling involves sizing a shrink film, which may be a tubular shrink sleeve, to a particular article. Then one shrinks the film to snugly wrap the article within the shrink sleeve. The shrinking process is generally accomplished by the application of heat or steam to the shrink sleeve. Further processing may include heat-sealing any unsealed portions of the shrink sleeve and/or covering the article contents with a shrink cover. The material used for shrink films, such as a shrink sleeve, may depend on the shape and weight of the article and its contents. The shrink sleeve may be polyethylene terephthalate, polyethylene terephthalate glycol, polyvinyl chloride, or oriented polystyrene, for example. The film has an inherent tension that is released by heating the film from the outside in a shrink oven. Shrink films may be produced in forms that may be oriented monoaxially (in a single direction). As the film cools, it shrinks snugly around the article. This shrinkage applies a very slight pressure to the article, which aids in holding the shrink film to the article.

Graphics, such as pictures, logos, and text for labels, may be reverse-printed on the shrink films and the shrink films then seamed, thereby forming a shrink sleeve. In general, shrink films are reverse-printed using flexographic and rotogravure printing technology. A master roll of shrink film is prepared with a number of label copies across its surface. The particular number of labels depends upon the size of the label copy and the width of the master roll. The printed rolls are then slit-cut, thereby forming individual rolls containing one copy of the label only. The slit rolls are then folded and overlapped, and seamed at the edge, forming a shrink sleeve that is wound on a core. The finished rolls are packaged and delivered to a particular location where each of the shrink sleeves will be applied to an article. These shrink sleeves are commonly used for full body decoration and tamper-evident applications.

When a shrink sleeve is used in tamper-evident applications, perforations may be provided in the shrink film. Generally, these perforations are provided on the shrink sleeve at a position that will be proximal to an opening of the article being labeled. In such a position, a portion of the shrink sleeve above the perforations will contact and confront a closure of the article, and a portion of the shrink sleeve below the perforations will contact and confront a body portion of the article. In use, the closure, such as a cap on a bottle, is removed by applying a twisting or rotating force (i.e., a torsional force) to the closure. As this occurs, the torsional force is also applied to the portion of the shrink sleeve confronting the closure of the article, while not being applied (at least without as much force) to the body portion of the article. As a result, the closure and the portion of the shrink sleeve contacting the closure are removed from the body portion of the article as the tamper-evident portion of the shrink sleeve (i.e., the portion contacting the closure) separates from the remainder of the shrink sleeve along the perforations. It is desirable that the portion of the label below the perforations stay bonded to the article after the consumer opens the article. In order to prevent slippage between the shrink sleeve and the body portion of the article, adhesives may be used to bond the body portion of the shrink sleeve and the body portion of the article to one another.

However, while adhesives may be applied to the portion of the shrink sleeve that contacts the body portion of the article, they are not applied to the portion of the shrink sleeve that contacts the closure of the article (i.e., the tamper-evident portion of the shrink sleeve "above" any perforation). This is because it is desired that the portion of the shrink sleeve confronting the closure be completely separated from the closure and discarded. This prevents any shrink sleeve from remaining on the closure where it could interfere with access to the contents of the article, or interfere with reattachment of the closure to the article.

Further, since the portion of the shrink sleeve that confronts the closure in tamper-evident applications is designed to be separated from both the closure and the remainder of the shrink sleeve, that portion generally is not labeled or otherwise decorated.

While shrink sleeves have been used on closures in tamper-evident applications, other types of materials (nonshrink films) have been used on closures for purposes other than tamper-evident applications. For example, pressure-sensitive labels have been positioned on the "land" (i.e., the top) of closures, such as caps for bottles. These labels may include decorations and/or labels. However, labels, such as the decorated pressure-sensitive labels, have not been applied to the sides of closures for various reasons. One reason is that the side surfaces of closures often include features like ridges or flanges that disrupt the ability of the label to adhere to, or otherwise associate with, the side of the closure, and also may interfere with the presentation of any decoration. Further, any label, such as the shrink sleeves described above, is easily separated from the closure due to the torsional forces applied when removing the closure from the container body. Thus, any label information is lost. Further, the appearance of an article having a label or other decoration removed due to these torsional forces may be unaesthetic.

In view of the above, it would be desirable to provide a decorated closure for an article having a shrink sleeve label that is associated with the side surface of the closure. Further, it would be desirable for the shrink sleeve to have decorations that are visible and intelligible (even on irregularly-shaped closures). It would be further desirable that such a decoration be impervious to torsional forces applied to the closure during use.

SUMMARY OF THE INVENTION

The present invention overcomes and eliminates the drawbacks described above in the Background of the Invention. The present invention does so by providing a decorated closure for an article, such as a container used to package an item or items. The decorated closure includes a shrink sleeve and a closure for an article. The closure has a top end, a bottom end, and a side surface. The closure may further include a centerpoint of the top end and a centerpoint of the bottom end with a longitudinal axis passing therethrough. The shrink sleeve is shrunk around at least the side surface of the article, and includes at least one visible decoration on a surface of the shrink sleeve. The portion of the shrink sleeve having the visible decoration is associated with at least a portion of the side surface of the closure.

The present invention further provides an adhesive for application proximal to an inner surface of a shrink sleeve. In particular, this adhesive may be applied to the inner surface of the shrink sleeve and may be adapted to contact a surface of the closure. The adhesive binds the shrink sleeve to the closure such that it can withstand the torsional forces generally applied during removal of the closure. Further, when bound, the shrink sleeve can withstand the torsional forces generated during a filling and capping process (such as when closures are predecorated—prior to filling of the article—and then attached to the article following filling).

As described above, one problem with prior inks used on shrink sleeves is that the inks are of a formulation that can absorb the adhesive, thus detracting from the ability of the shrink sleeve to properly adhere to a surface. This problem is especially pronounced in a shrink sleeve in contact with a portion of an article that is subjected, often repeatedly, to torsional forces (i.e., the closure). To eliminate this problem, the present invention provides an ink having a formulation that does not absorb any adhesive used. In particular, the ink may include a nitro-acrylic based resin including a pigment comprising $TiO_2$, and a plasticizer having a wax additive. Further, the ink may not include calcium carbonate in its formulation.

Thus, using the shrink sleeve film, adhesive, and inks described above, the present invention also provides a laminate including a film for a shrink sleeve, an ink layer disposed on an inner surface of the shrink sleeve, and an adhesive layer disposed on the ink layer. The ink layer, as described above, includes a plasticized nitro-acrylic based resin including a pigment load (such as $TiO_2$), and a wax additive. The wax additive promotes the adhesive layer to lay out smoothly on the surface of the ink layer, rather than seeping into the ink layer. This, in turn, promotes adhesion of the laminate to an article to which it is applied. Further, the ink layer, in certain embodiments, does not include calcium carbonate.

Finally, the present invention also provides a method of applying a shrink sleeve over a closure for an article. The method includes providing a shrink sleeve having an axis of symmetry and at least one decoration visible on an outer surface of the shrink sleeve. One also provides a closure for an article, the closure having a top end, a bottom end, a side surface, and a longitudinal axis passing through a centerpoint of the top end and a centerpoint of the bottom end. The article is oriented such that the longitudinal axis is substantially parallel to the axis of symmetry. The shrink sleeve is positioned over and around the closure such that at least a portion of the closure is disposed within and substantially surrounded by the shrink sleeve. And the shrink sleeve is shrunk such that the shrink sleeve constricts around at least a portion of the side surface of the closure, thereby positioning the shrink sleeve such that the at least one decoration is visible on an outer surface of the shrink sleeve.

As a result of the present invention, brand recognition can be developed by including a shrink sleeve with decoration (such as a brand label) on a closure because the consumer's eye is drawn to the closure. Further, the present invention allows maximum use of the "real estate" on a container, since closures were not previously a surface used in labeling. And further still, the use of the shrink sleeve on the closure reduces costs for a customer company by removing the need for a colorant for the closure.

Additional characteristics of the shrink sleeve of the present invention will be apparent from the following detailed drawings and description of the invention.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1A:
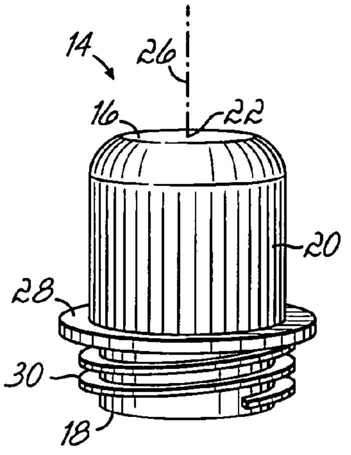
FIG. 1A is a perspective view of a closure for a container.

Referring now to the Figures, the present invention provides a labeled article 10 for packaging an item or items. This labeled article 10 includes a shrink sleeve 12 and an article 10 including a closure 14. In particular, and referring to FIGS. 1A-1C, in a first aspect, the present invention provides a decorated closure 14 for an article 10, such as a container used to package an item or items. The decorated closure 14 includes a shrink sleeve 12 and a closure 14 for an article 10. The closure 14 has a top end 16, a bottom end 18, and a side surface 20. The closure 14 may further include a centerpoint 22 of the top end 16 and a centerpoint 24 of the bottom end 18 with a longitudinal axis 26 passing therethrough. As shown in FIG. 1A, the closure 14 includes a flange 28 and screw threads 30 proximal its bottom end 18. It should be recognized that the closure 14 including flange 28 and screw threads 30 is merely exemplary, and any type of closure 14 may be used.

Figure 1B:
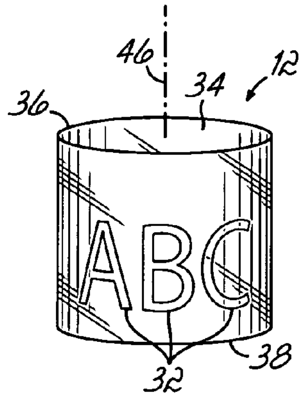
FIG. 1B is a perspective view of a shrink sleeve including decoration, in accordance with the principles of the present invention.

As shown in FIG. 1B, the shrink sleeve 12 is formed from a shrink film. The material used for shrink films, such as a shrink sleeve 12, may depend on the shape of the closure 14. The shrink sleeve 12 may be a polyethylene terephthalate, polyethylene terephthalate glycol, polyvinyl chloride, or oriented polystyrene, for example. The film has an inherent tension that is released by heating the film from the outside in a shrink oven. The film may be oriented monoaxially (in a single direction). Decorations 32, such as pictures, logos, and text for labels, may be reverse-printed on the shrink film and the shrink films may be seamed, thereby forming the shrink sleeve 12 (as shown in FIG. 1B). The shrink film may be reverse-printed using flexographic and rotogravure printing technology, for example.

The shrink sleeve 12 is shrunk around at least the side surface 20 of the article 10, and includes at least one visible decoration 32 on a surface of the shrink sleeve 12. Such a decoration 32 may be provided by various inks well known to those skilled in the art. These may be reverse-printed on or proximal to the inner surface 34 of the shrink films (i.e., the surfaces that will be applied toward the surface of the closure 14). Alternatively, the inks may be applied on or proximal to the outer surface of the shrink films. "Applied on," as used here, means there is direct contact between the inks and the surface of the shrink film. "Applied proximal to," as used here, means that although the inks are applied to the same side as a surface of the shrink film, it is not necessary that there be any direct contact between the inks and the surface (although there may be). For example, another layer, or layers, may be disposed between the inks and the surface that the inks or inks are "applied proximal to."

Figure 1C:
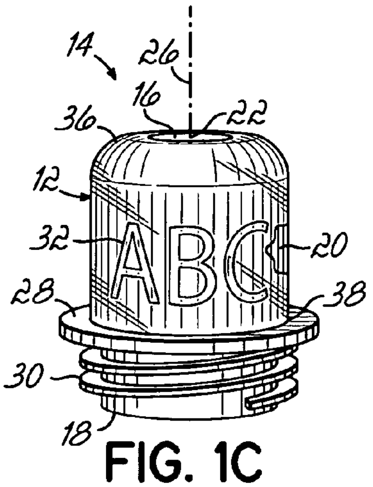
FIG. 1C is a perspective view of the shrink sleeve of FIG. 1B placed over and shrunk about the closure of FIG. 1A, in accordance with the principles of the present invention.
Figure 2A:
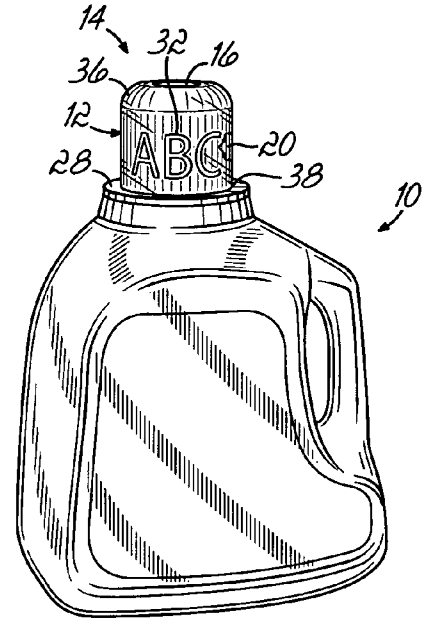
FIG. 2A is a perspective view of the closure and shrink sleeve of FIG. 1C used in conjunction with a container.

In the illustrated embodiment (as seen in FIGS. 1C and 2A), the decoration 32 is visible to an observer on a side surface of the shrink sleeve 12, and thus the closure 14, once the shrink sleeve 12 is associated with the closure 14, such as by being shrunk around the closure 14. The decoration 32 of the illustrated embodiment is shown as being visible only partially circumferentially about the shrink film, and thus the closure 14. However, in alternate embodiments, any decoration 32 may be present substantially about the entire circumference of the shrink sleeve 12, and thus the closure 14. In still other embodiments, the shrink sleeve 12 may provide a plurality of visible decorations 32 about a surface of the shrink sleeve 12. The decorated closure 14 of the first aspect of the present invention thus increases the available decorating surface (such as for labeling) on an article 10 to areas previously unused. As discussed above in the Background of the Invention section, prior to the shrink sleeve 12 of the present invention, labels were not provided on a side surface 20 of a closure 14.

Figure 2B:
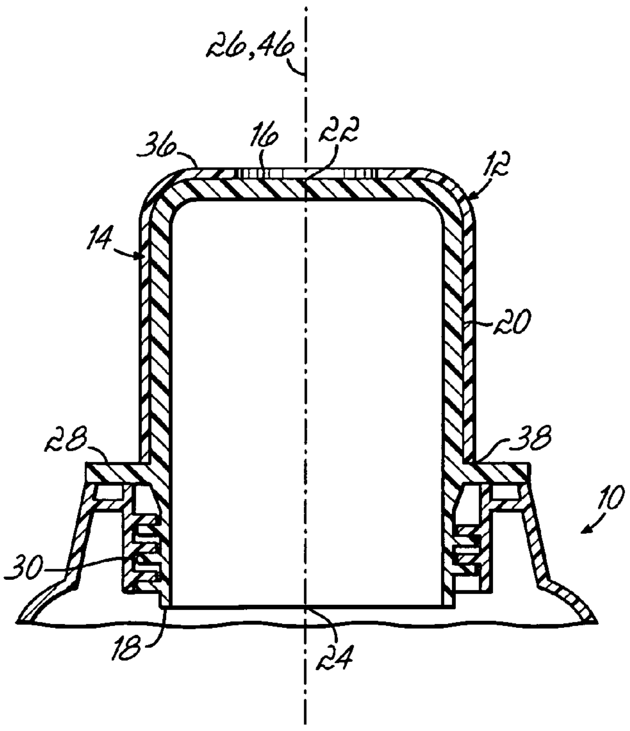
FIG. 2B is a cross-sectional view of the container, closure, and shrink sleeve of FIG. 2A.

Further, and referring now to FIGS. 1C, 2A, and 2B, a substantial portion of the shrink sleeve 12 contacts and confronts the side surface 20 of the closure 14. However, a portion 36 of the shrink sleeve 12 may confront the top surface of the closure 14. In particular, a portion of the top end of the shrink sleeve 12, in an amount of at least 1 mm, may confront the top surface of the closure 14. This contact occurs as the shrink sleeve 12 is shrunk against the closure 14. As the shrink sleeve 12 is placed around the side surface 20 of the closure 14, the length of the shrink sleeve 12 may be greater than the vertical length of the side surface 20 of the closure 14. Thus, a portion of the shrink sleeve 12 proximal the top portion of the shrink sleeve 12 extends past the side surface 20 of the closure 14. As heat is applied to the shrink sleeve 12, it shrinks about the side surface 20 of the closure 14, and the extra portion 36 at the top shrinks to confront a portion of the top surface of the closure 14. The portion 36 of the shrink sleeve 12 that overlies, and thus contacts, the top of the closure 14, may further assist in holding the shrink sleeve 12 to the closure 14. This may occur regardless of the presence of any adhesive 40 on the inner surface 34 of the shrink sleeve 12.

Additionally, a portion of the shrink sleeve 12 may confront a bottom surface of the closure 14 (although this embodiment is not shown in the figures). In particular, a portion of the bottom end of the shrink sleeve 12, in an amount of at least 1 mm, may confront the bottom surface of the closure 14. This contact occurs as the shrink sleeve 12 is shrunk against the closure 14. As the shrink sleeve 12 is placed around the side surface 20 of the closure 14, the length of the shrink sleeve 12 may be greater than the vertical length of the side surface 20 of the closure 14. Thus, a portion of the shrink sleeve 12 proximal the bottom portion of the shrink sleeve 12 extends past the side surface 20 of the closure 14. As heat is applied to the shrink sleeve 12 it shrinks about the side surface 20 of the closure 14 and the extra portion at the bottom may shrink about a portion of the bottom surface of the closure 14. The portion of the shrink sleeve 12 that overlies, and thus contacts, the bottom of the closure 14 may further assist in holding the shrink sleeve 12 to the closure 14. This may occur regardless of the presence of any adhesive 40 on the inner surface 34 of the shrink sleeve 12.

In the illustrated embodiment, as shown in FIGS. 1C, 2A, and 2B, the bottom surface of the shrink sleeve 12 does not contact the bottom surface of the closure 14 so as to overlie the bottom surface of the closure 14. Rather, while a substantial portion of the shrink sleeve 12 contacts and confronts the side surface 20 of the closure 14, it can be seen that a portion 38 of the shrink sleeve 12 confronts the flange 28.of the closure 14. In particular, the bottom end of the shrink sleeve 12 may be flush with and confront the flange 28 of the closure 14. This contact occurs as the shrink sleeve 12 is shrunk against the closure 14. As the shrink sleeve 12 is placed around the side surface 20 of the closure 14, it is positioned such that a portion of the shrink sleeve 12 is flush the bottom of the side surface 20 of the closure 14. As heat is applied to the shrink sleeve 12 it shrinks about the side surface 20 of the closure 14.

Figure 3:
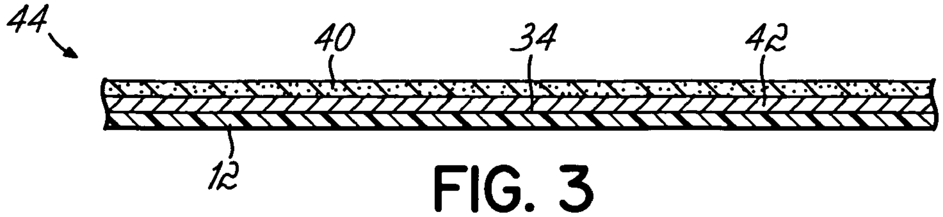
FIG. 3 is a cross-sectional view of a shrink sleeve laminate in accordance with the principles of the present invention.

Referring now to FIG. 3, the decorated closure 14 further includes an adhesive 40 disposed proximal to an inner surface 34 of the shrink sleeve 12. "Disposed proximal to," as used here, means that although the adhesive 40 is applied to the same side as a surface (i.e., the inner surface 34) of the shrink sleeve 12, it is not necessary that there be any direct contact between the adhesive 40 and the surface (although there may be). For example, another layer or layers, such as an ink layer 42 (see FIG. 3), may be disposed between the adhesive 40 and the surface that the adhesive 40 is "disposed proximal to." In the illustrated embodiment, the adhesive 40 is disposed proximal to the inner surface 34 in a flood pattern. The adhesive 40 may have a coat weight in a range of about 0.5 lb./ream to about 1.25 lb./ream. A ream is typically 3000 $ft^2$. In alternative embodiments, the adhesive 40 may be otherwise applied, such as in a pattern of adhesive droplets. Several different adhesives well known to those skilled in the art may be used with the shrink sleeve 12 described herein. These adhesives may include ethylene vinyl acetate-based resins, such as water-born EVA and solvent-based EVA.

During shrinking of the shrink sleeve 12 to the closure 14, temperatures generally need to be high enough to cause shrinking of the film, and yet low enough to avoid deforming, or otherwise damaging, the closure 14 and/or article 10. Thus, the adhesive 40 needs to activate in a temperature range similar to the temperatures used to shrink the film. The adhesive 40 activates at a temperature lower than a temperature that would cause deformation of the closure 14 and/or article 10. In one embodiment, the adhesive 40 may activate between about 140° F. and about 190° F. Alternatively, the adhesive 40 may begin to activate at about 140° F., and fully activate at about 190° F. After being shrunk against the closure 14, the shrink sleeve 12 may withstand up to about 135 inch pounds of torque without being separated from the closure 14.

Still referring to FIG. 3, the invention may further include an ink layer 42 disposed proximal to the inner surface 34 of the shrink sleeve 12. "Disposed proximal to," as used here, means that although the ink is applied to the same side as a surface (i.e., the inner surface 34) of the shrink sleeve 12, it is not necessary that there be any direct contact between the ink and the surface (although there may be). For example, another layer or layers may be disposed between the ink and the surface that the adhesive 40 is "disposed proximal to."

The invention of the illustrated embodiment thus includes an adhesive layer 40 disposed proximal to the ink layer 42, such that the ink layer 42 is disposed between the inner surface 34 of the shrink sleeve 12 and the adhesive layer 40

(see FIG. 3). The ink layer 42 may further include a background white ink. Many labels include a background white ink as the "last-down" ink to provide a contrast to the other graphics of the label. Thus, the background white ink is the ink of the ink layer 42 that may directly contact any adhesive layer 40. While the background ink is described as a "background white ink," it will be recognized that the background ink need not be white, but can be any other color desired. As described above, one problem with inks used on shrink sleeves 12 previously is that the inks are of a formulation that absorbs the adhesive 40, thus detracting from the ability of the shrink sleeve 12 to properly adhere to a container side surface. Such a problem would be especially pronounced in a portion of a container (i.e., the closure 14) that is subjected, often repeatedly, to more severe torque and other forces. Thus, the present invention further provides an ink for application to an inner surface 34 of a shrink sleeve 12, the ink having a formulation that does not absorb the any adhesive 40 used. In particular, the ink may include a plasticized nitro-acrylic based resin including a pigment load (such as $TiO_2$), and a wax additive. The resin may also be a nitro resin. The wax additive may be PTFE, for example. The wax additive promotes the adhesive layer laying out smoothly on the surface of the ink layer, rather than seeping into the ink layer. This, in turn, promotes adhesion of the laminate to an article to which it is applied. Further, the ink does not include any calcium carbonate.

The ink of the present invention thus eliminates the absorption problem. It will be recognized by those skilled in the art that the "background white ink" is merely exemplary, and any ink that is going to contact the adhesive 40 can be prepared as an ink without calcium carbonate. Additionally, or alternatively, such ink may be prepared with plasticized nitro-acrylic-based resin with a pigment load (such as $TiO_2$), and a wax additive.

Thus, using the shrink sleeve 12 film, adhesive 40, and inks described above, the present invention also provides a laminate 44 including a film for a shrink sleeve 12, an ink layer 42 disposed on the inner surface 34 of the shrink sleeve 12, and an adhesive layer 40 disposed on the ink layer 42. The ink layer 42, as described above, includes a plasticized nitro-acrylic based resin including a pigment (such as $TiO_2$), and a wax additive; and the ink layer 42 does not include calcium carbonate.

Figure 4:
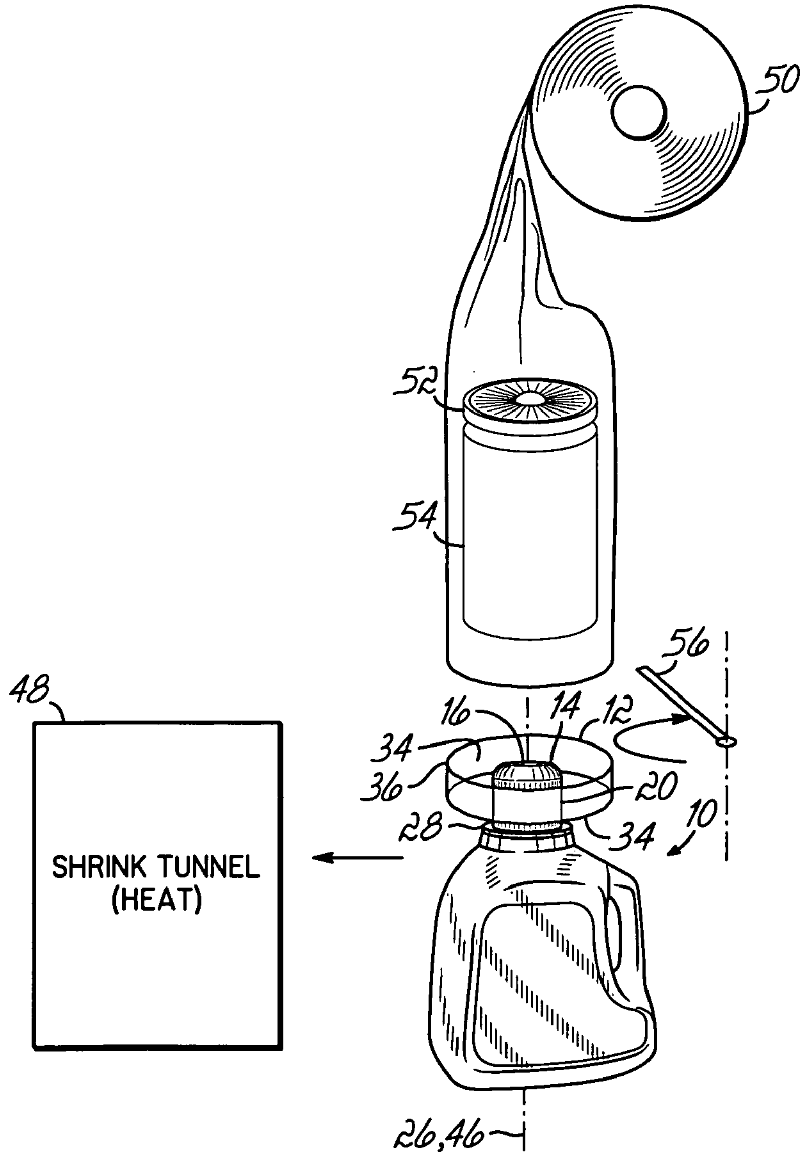
FIG. 4 is a schematic of the process of shrinking a shrink sleeve about a closure in accordance with the principles of the present invention.

Referring now to FIG. 4, the present invention also provides a method for providing a shrink sleeve 12 over an article 10 such that, in use, the shrink sleeve 12 will not slip or tear away from the closure 14 of an article 10 with which it is associated. This method includes the steps of first providing a shrink sleeve 12 generally as described above, which has an axis of symmetry 46.

The method of the present invention also includes providing a closure 14 having a top end 16, a bottom end 18, a side surface 20, and a longitudinal axis 26 passing through a centerpoint 22 of the top end 16 and a centerpoint 24 of the bottom end 18. This closure 14 is then oriented such that the longitudinal axis 26 of the closure 14 is substantially parallel to the axis of symmetry 46.

Next, the shrink sleeve 12 is positioned over and around the closure 14 such that at least a portion of the side surface 20 of the closure 14 is disposed within and substantially surrounded by the shrink sleeve 12. Finally, the shrink sleeve 12 is shrunken such that the inner surface 34 of the shrink sleeve 12 constricts around a portion of the side surface 20 of the closure 14.

In general, the method of the present invention also allows for applying shrink sleeves 12, which may include labels, to closures 14 by moving the closure 14 into proximity with a source of shrink sleeve 12 film, positioning a strip of tubular shrink sleeve 12 around each closure 14, and heating the shrink sleeve 12 to shrink it against the closures 14. Additionally, the method includes severing the shrink sleeve 12 between adjacent closures 14 to separate them into individual shrink sleeves 12, each associated with one such closure 14. In one particular embodiment of the invention, the shrink sleeves 12 are heat-shrunken on the articles 10 using hot air in a shrink tunnel 48, through which the closures 14 and associated shrink sleeve films 12 are moved.

In the illustrated embodiment of the present invention, the shrink sleeve apparatus includes a roll 50 from which the plastic shrink sleeve 12 is dispensed, an air source 52, a mandrel 54, a cutoff device 56, and a shrink tunnel 48. In particular, a master roll 50 of shrink film is prepared with a number of label copies across its surface. The particular number of labels depends upon the size of the label copy and the width of the master roll 50. The printed rolls 50 are then slit-cut, thereby forming individual rolls 50 containing one copy of the label only. The slit rolls 50 are then folded and overlapped, and seamed at the edge, forming a shrink sleeve 12 that is wound on a core.

In operation, an article 10, such as a bottle including a closure 14, is guided underneath the air source 52 and mandrel 54. The mandrel 54 is aligned with the shrink sleeve film 12, which is obtained from the roll 50. A shrink sleeve 12 is pulled from the roll 50 and is blown open into its tubular form by air from the air source 52. This tubular shrink sleeve 12 is then positioned over and slipped past the mandrel 54 in order to maintain its tubular form and to guide the shrink sleeve 12 over the closure 14 of the article 10. In the present invention, as the closures 14 are positioned proximal to the shrink sleeve 12 and mandrel 54, they are positioned such that the longitudinal axis 26 of each closure 14 is substantially parallel to the axis of symmetry 46 of the shrink sleeve 12. After the shrink sleeve 12 is guided and positioned around the closure 14, a cutoff device 56 is used to sever the shrink sleeve 12 from the remainder of the roll 50 of film. Next, the closure 14 and the loose plastic shrink sleeve 12 proceed through the shrink tunnel 48, which shrinks the shrink sleeve 12 against the closure 14 through the application of heat. The heat for shrinking may be provided by steam. Alternatively, heat may be provided by a hot air manifold. Also, heat may be applied by a combination of these methods, for example, steam heat coupled with air movement. A constant heat may be applied to the shrink sleeve 12 and closure 14. Alternatively, the shrink sleeve 12 and closure 14 may experience gradations of temperature as they move through the shrink tunnel 48. In one embodiment, heat may be applied to the shrink sleeve 12 and closure 14 at a temperature in the range of about 140° F. to about 190° F. Such a shrink sleeve apparatus is commercially available from Nippon Automatic Fine Machinery Company of Anaheim Hills, Calif.

The desired temperature within the shrink tunnel 48 depends upon a number of factors, such as the speed at which the closure 14 and plastic shrink sleeve 12 are moved through the tunnel 48, and also the particular composition and thickness of the plastic film. In general, in one embodiment, heat should be applied that will reduce the size of the shrink sleeve 12 from 40% to 70%.

Following shrinking, the closure 14 and shrink sleeve 12 may then be cooled by subjecting the shrink sleeve 12 to ambient temperatures to allow for a gradual cooling process. Alternatively, the shrink sleeve 12 may undergo other cooling steps, such as subjecting the shrink sleeve 12 to cool air or liquid.

While the present invention has been disclosed by reference to the details of preferred embodiments of the invention, it is to be understood that the disclosure is intended as an illustrative rather than in a limiting sense, as it is contemplated that modifications will readily occur to those skilled in the art, within the spirit of the invention and the scope of the amended claims.

What is claimed is:

1. A decorated closure for an article, the article used to package an item or items, the decorated closure comprising:

a shrink sleeve having a film including one or more of polyethylene terephthalate, polyethylene terephthalate glycol, polyvinyl chloride, polystyrene, polyolefin, and polylactic acid; and a closure for an article, said closure having a top end, a bottom end, and a side surface, said side surface extending between said top end and said bottom end;

wherein said shrink sleeve is shrunk around at least said side surface of said closure and does not extend past said bottom end of said closure, and said shrink sleeve confronts said side surface, and said shrink sleeve further includes at least one visible decoration on a surface of said shrink sleeve.

2. The decorated closure of claim 1, wherein said at least one decoration is present substantially circumferentially about said shrink sleeve.

3. The decorated closure of claim 1, further comprising a plurality of visible decorations on said surface of said shrink sleeve.

4. The decorated closure of claim 1, wherein said top end includes a top surface, and a portion of said shrink sleeve confronts said top surface of said closure.

5. The decorated closure of claim 1, further comprising an adhesive applied proximal to an inner surface of said shrink sleeve.

6. The decorated closure of claim 5, wherein said adhesive is applied in a flood pattern.

7. The decorated closure of claim 5, wherein said adhesive has a coat weight in a range of about 0.5 to about 1.25 lb./ream.

8. The decorated closure of claim 5, wherein said adhesive is an ethylene vinyl acetate based adhesive.

9. The decorated closure of claim 5, wherein said adhesive activates between about 140° F. and about 190° F.

10. The decorated closure of claim 5, wherein said adhesive begins to tackify at about 140° F. and fully tackifies at about 190° F.

11. The decorated closure of claim 5, wherein said adhesive activates at a temperature lower than a temperature that would cause deformation of said closure.

12. The decorated closure of claim 5, further comprising an ink layer disposed proximal to an inner surface of said shrink sleeve.

13. The decorated closure of claim 12, further comprising an adhesive layer disposed proximal to said ink layer, such that said ink layer is disposed between said inner surface of said shrink sleeve and said adhesive layer.

14. The decorated closure of claim 12, wherein said ink layer includes a background ink.

15. The decorated closure of claim 14, wherein said background ink is a background white ink, said background white ink further comprising a nitro-acrylic based resin including a pigment comprising $TiO_2$, and a plasticizer having a wax additive.

16. The decorated closure of claim 14, wherein said background ink is a background white ink, and wherein said background white ink does not include calcium carbonate.

17. The decorated closure of claim 1, wherein said shrink sleeve can withstand up to about 135 inch pounds of torque without being separated from said closure.

18. In combination, a decorated closure for an article and an article used to package an item or items, the combination comprising:

a shrink sleeve having a first surface and a second surface, the shrink sleeve having a film including one or more of polyethylene terephthalate, polyethylene terephthalate glycol, polyvinyl chloride, polystyrene, polyolefin, and polylactic acid;

a closure for an article, said closure having a top end, a bottom end, and a side surface, said side surface extending between said top end and said bottom end; and an article;

wherein said closure is adapted to be releasably coupled to said article;

wherein said shrink sleeve is shrunk around at least said side surface of said closure with at least a portion of the first surface confronting said side surface; and wherein said first surface of said shrink sleeve does not confront said article when said shrink sleeve is intact around at least said side surface of said closure.

* * * * *

UNITED STATES PATENT AND TRADEMARK OFFICE

CERTIFICATE OF CORRECTION

PATENT NO. : 7,829,163 B2
APPLICATION NO. : 11/253044
DATED : November 9, 2010
INVENTOR(S) : Philip J. Albenice et al.

It is certified that error appears in the above-identified patent and that said Letters Patent is hereby corrected as shown below:

Column 1,
Line 7, "...articles, and in particular, to..." should be -- ...articles and, in particular, to... --.

Column 5,
Line 10, "...that the inks or inks..." should be -- ...that the ink or inks... --.

Column 6,
Line 11, "...flange 28.of the..." should be -- ...flange 28 of the... --.

Column 7,
Line 18, "...does not absorb the any..." should be -- ...does not absorb any... --.

Column 10,
Line 17 (claim 15), "...comprising TiO2,..." should be -- ...comprising $TiO_2$,... --.

Signed and Sealed this
Twenty-sixth Day of July, 2011

David J. Kappos
*Director of the United States Patent and Trademark Office*